United States Patent [19]

Russo et al.

[11] Patent Number: 4,951,909
[45] Date of Patent: Aug. 28, 1990

[54] MOUNTING MEANS FOR ADVERTISING DISPLAYS

[76] Inventors: Roger A. Russo, 82 Lake Rd., Congers, N.Y. 10920; Harris Taylor, 648 Piermont Ave., Piermont, N.Y. 10968

[21] Appl. No.: 399,121
[22] Filed: Aug. 28, 1989
[51] Int. Cl.$^5$ .............................................. F16B 47/00
[52] U.S. Cl. .......................... 248/206.2; 160/238;903; 248/206.1
[58] Field of Search ...................... 248/267, 266, 206.2, 248/206.3, 206.1, 205.5, 341; 160/368.1, 370.2, DIG. 13; 40/597, 514

[56] References Cited

U.S. PATENT DOCUMENTS

| | | | |
|---|---|---|---|
| 1,648,994 | 11/1927 | Pitman | 160/DIG. 13 X |
| 1,859,594 | 5/1932 | Meyer . | |
| 1,913,961 | 6/1933 | Shape . | |
| 1,957,847 | 5/1934 | Peters | 45/97 |
| 1,987,259 | 1/1935 | Koehler | 160/370.2 X |
| 2,165,814 | 7/1939 | Redmond | 248/206.1 X |
| 2,525,513 | 10/1950 | Barr | 248/267 |
| 2,561,188 | 7/1951 | Ferguson | 160/DIG. 13 X |

FOREIGN PATENT DOCUMENTS

| | | | |
|---|---|---|---|
| 0025976 | 9/1953 | Finland | 248/267 |
| 0441647 | 1/1968 | Switzerland | 248/206.1 |

Primary Examiner—David L. Talbott
Assistant Examiner—Daniel Hulseberg
Attorney, Agent, or Firm—Stanley J. Yavner

[57] ABSTRACT

A pair of suction-held shade brackets are provided in a design whereby the brackets each include depending and curved bracket element holders depending from the back sides of suction cups. The suction cups are intended to be affixed to either glass or wood surfaces, not necessarily conforming, for instance, to window frames, but instead to be affixed on window panes, between window frames. Also, the suction cups can be affixed to materials adjacent window panes, which do not lend themselves readily to screw holes or attachment means, other than suction. Within one of the bracket element holders, a bracket element is provided, which defines a centrally located circular opening, defined by an element whose outer periphery is octagonal in shape, conforming to the shape provided for the element by the element holder. The other of the pair of bracket elements defines centrally a circular hole or a square hole with an extended slot leading to the outer periphery of the bracket element, which is also generally in the shape of an octagon. Of course, the bracket element holder and element is either constructed of one piece or two separate pieces. The pair of suction units is intended for use as either an advertising device, with advertising matter printed on the shade to be held, or a regular shade holder.

1 Claim, 1 Drawing Sheet

U.S. Patent
Aug. 28, 1990
4,951,909
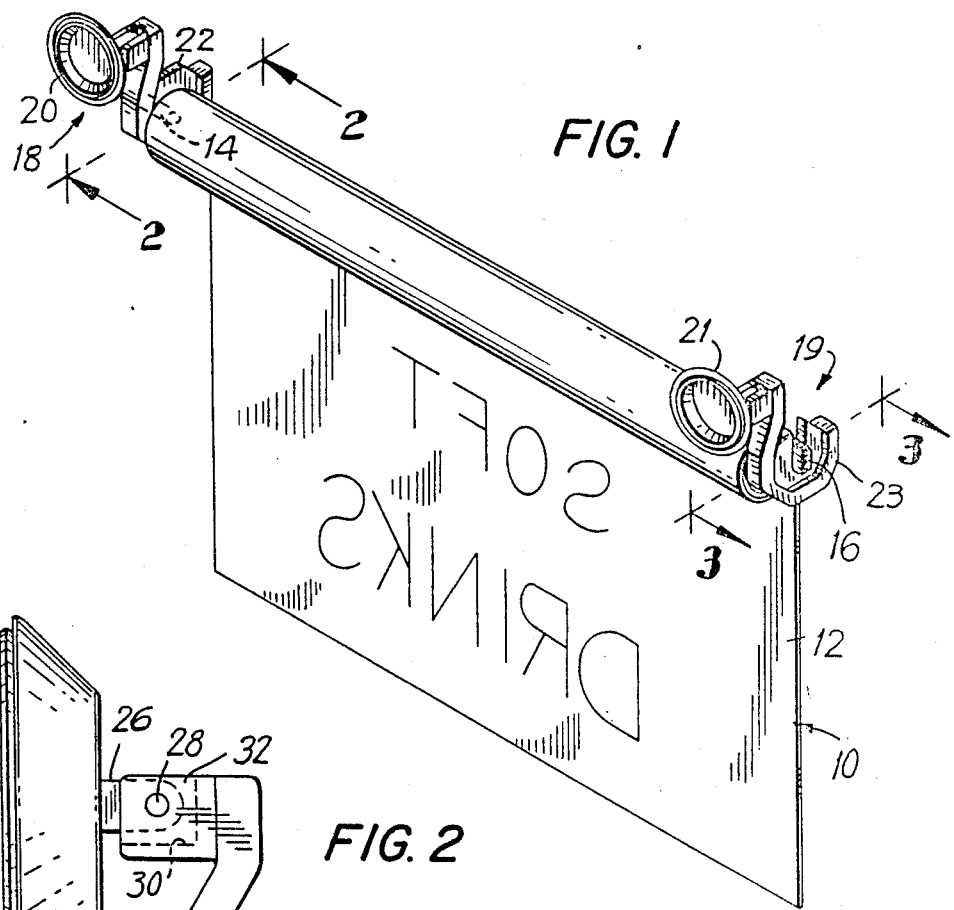
FIG. 1
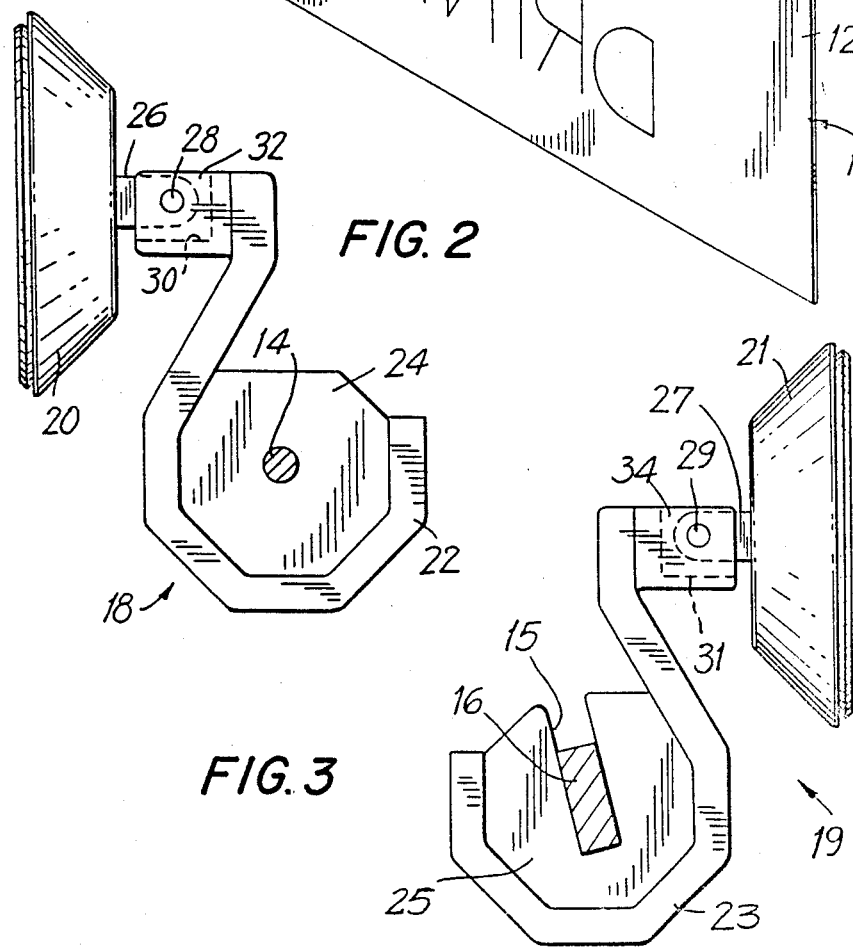
FIG. 2
FIG. 3

MOUNTING MEANS FOR ADVERTISING DISPLAYS

BACKGROUND OF THE INVENTION

This invention relates primarily to mounting means for advertising displays and more particularly to suction holders for roll-up advertising displays.

Display advertisements are widely used in the current marketplace in order to provide a medium for promoting the goods and services in a wide range of industries. For instance, billboards are used for both roadside and building mounted information about a particular company's goods or services; but such billboard advertisement is expensive both in terms of construction and/or space rental. In-house, retail level advertising displays are also widely used, wherein a shelf unit, or the like, is associated with a particular source of goods or services. Floor stand signs are also used in this field, but the excessive occupancy of space and complexity of the construction are drawbacks in this particular segment of the field.

Contrary to the examples given above, wall space within a retail establishment, or the like, is relatively of lesser expense in terms of constructing advertising displays and in terms of space occupation. In the same vein, window mounting for advertising displays is a more viable alternative.

Alternatively, scenic enhancements are always of value to both the home owners and such environments as schools, in terms of windows, doors and walls.

For instance, during special occasions and holiday season, such as Christmas and spring holidays, it is sometimes desired to decorate, without necessarily using the full width of windows, the frames therefor, or wall or door frames. Also, the same considerations are present in terms of presenting holiday decorations in schools or other places. Additionally, school logos are sometimes desirable to present as a display.

Therefore, adaption of the usual displays are sometimes desirable and/or necessary. The foregoing also holds true with respect to sports posters, movie star posters, auto posters and various other hobby or interest posters.

Accordingly, a primary object of the present invention is to provide a construction for displays, which is economical in terms of construction costs, versatile and economic with respect to space occupation.

Another object of the present invention is to provide a construction for advertising displays, which is economic in terms of construction costs, versatility and economy of space occupation.

A further, and more particular object of the present invention is to provide a display advertisement construction which is easy to manufacture, to assemble and to provide versatility of use and interchangeability.

These and other objects and features of the present invention are provided in an advertising display mounting construction which includes a structure for use either as an advertising display or, alternatively, as a window shade holder. Included within the construction are a pair of suction-held shade brackets, wherein the brackets each comprise depending and curved bracket element holders depending from the back side of the suction cup. Within one of the bracket element holders, a bracket element is provided, with a centrally located circular opening defined by the element base, whose outer periphery is octagonal in shape in order to conform to the shape provided within the element holder. The other of the pair is identical, except that the centrally defined opening is preferably rectangular leading from the center of the bracket element to the periphery thereof. The pair of openings is similar in form to that normally provided in window shade brackets for retractable roll-up shades commonly sold and used.

Other objects, features and advantages of the present invention will become even more apparent by the following detailed description of preferred and alternative, but nonetheless illustrative, embodiments, with reference to the accompanying drawings, wherein:

FIG. 1 is an isometric view of an assembled advertising display mounting construction, showing particularly the use of suction cups and bracket elements for holding the display;

FIG. 2 is a side elevational view showing the first of the pair of brackets; and FIG. 3 is a side elevational view showing the other of the pair of brackets according to the present invention, with each of FIGS. 2 and 3 showing sectional views of the roll hardware ends for the advertising display, taken along the lines 2—2 and 3—3 in FIG. 1.

DETAILED DESCRIPTION OF THE PREFERRED AND ALTERNATIVE EMBODIMENTS

Referring to the drawings, a shade, generally designated 10, of the usual construction is shown to be used as a display advertisement. Of course, the shade is constructed in the usual manner, as with those shades used commonly for window coverings in a household. The shade material 12 is rolled on to an appropriate roller, not shown, which is spring-loaded and biased, with hardware 14, 16, protruding from the ends. First element of shade hardware 14, is a cylindrical pin, and the second element 16 is an elongated rectangle.

First bracket, generally designated 18 comprises a bracket, at the uppermost end of which is attached suction cup 20, depending from which is bracket element holder 22. Bracket element holder 22 has a c-shape, wherein the preferred embodiment defines the inside of the c-shape in octagonal form, aesthetically and to avoid rotation of the inserted bracket element 24, (which lack of rotation is even more important with respect to the second of the pair of bracket elements, as will be described.) Still further, a mechanism 26 is provided, wherein suction cup 20 is made tiltable within a certain range primarily to accommodate tilted surfaces, to which the construction may be attached.

The other bracket, generally designated 19, is of similar construction, but the bracket element 25, although octagonal in outside periphery shape, is in slightly altered form, whereby such element 25 defines a rectangular opening 15, into which is inserted hardward piece 16. Otherwise, bracket element holder 23 is of the same shape and construction as that previously described for the first of the pair of brackets. Also, tiltable means 27 is identical, as is suction cup 21.

Tiltable means 26 and 27 are shown whereby a pin 28, 29 permits the rotation of the suction cups within an opening 30, 31 in the connective block 32, 34 between depending bracket element holders 22, 23 and suction cups 20, 21.

Of course, the shade and mounting construction shown and described is used just as easily for a common window shade, but with the added convenience of being able to attach the mounting brackets between window frames, such as on a pane, or the like. The mounting means is also usable with an irregular surface and with surfaces not readily amenable to the use of screws, or the like.

The foregoing describes a mounting bracket construction for advertising displays, window shades, or the like, and is to be limited only by the following claims:

What is claimed is:

1. A mounting bracket construction for use with a retractable display shade on a roller, extending from which is a hardware pin at each end, the first of said pins being cylindrical in form and the second of said pins being rectangular in cross-section, comprising a pair of brackets, each of which includes a depending, C-shaped bracket element holder having a space along its periphery and a recess therein shaped for receiving and mating with an octagonally shaped bracket element, a suction cup provided at an uppermost end of each bracket element holder, and a means for tilting each suction cup relative to its corresponding bracket element holder;

and a pair of octagonally shaped bracket elements corresponding to and inserted within the recesses of said bracket element holders, the first bracket element of said pair of octagonally shaped bracket elements having a central, circular opening therethrough, and the second bracket element of said pair of octagonally shaped bracket elements having a rectangular slot extending from the center of the bracket element to an edge of the bracket element so as to correspond with said space along the periphery of said bracket element holder.

* * * * *